US008298303B2

(12) United States Patent
Jacob

(10) Patent No.: US 8,298,303 B2
(45) Date of Patent: Oct. 30, 2012

(54) USE OF POLYOXYMETHYLENE DI (ALKYL POLYGLYCOL) ETHERS AS ADDITIVES TO DIESEL FUELS TO REDUCE THE PARTICULATE EMISSION IN SELF-IGNITION ENGINES

(75) Inventor: Eberhard Jacob, Krailing (DE)

(73) Assignee: MAN Nutzfahrzeuge AG, Munich (DE)

( * ) Notice: Subject to any disclaimer, the term of this patent is extended or adjusted under 35 U.S.C. 154(b) by 0 days.

(21) Appl. No.: 13/010,476

(22) Filed: Jan. 20, 2011

(65) Prior Publication Data

US 2011/0131871 A1    Jun. 9, 2011

Related U.S. Application Data

(63) Continuation of application No. PCT/EP2010/056089, filed on May 5, 2010.

(30) Foreign Application Priority Data

Jul. 31, 2009 (DE) .......................... 10 2009 035 503

(51) Int. Cl.
*C10L 1/18* (2006.01)

(52) U.S. Cl. ......................................... 44/447; 44/445

(58) Field of Classification Search .................... 44/445, 44/447
See application file for complete search history.

(56) References Cited

U.S. PATENT DOCUMENTS

| 2,763,537 | A | * | 9/1956 | Barusch et al. | 44/326 |
|---|---|---|---|---|---|
| 3,594,138 | A | | 7/1971 | Badin | |
| 5,425,790 | A | | 6/1995 | Liotta, Jr. et al. | |
| 5,520,710 | A | * | 5/1996 | Olah | 44/447 |
| 5,747,410 | A | * | 5/1998 | Muramatsu et al. | 502/348 |
| 6,350,919 | B1 | * | 2/2002 | Hagen et al. | 568/485 |
| 7,235,113 | B2 | * | 6/2007 | Sanfilippo et al. | 44/444 |

FOREIGN PATENT DOCUMENTS

| EP | 0014992 A1 | | 9/1980 |
|---|---|---|---|
| GB | 565465 | * | 1/1941 |
| GB | 1246853 | | 9/1971 |
| WO | WO-86/03511 A1 | | 6/1986 |
| WO | WO-2007/000428 A1 | | 1/2007 |

* cited by examiner

*Primary Examiner* — Cephia D Toomer
*Assistant Examiner* — Monique Cole
(74) *Attorney, Agent, or Firm* — Leason Ellis LLP

(57) ABSTRACT

The use of polyoxymethylene di(alkyl polyglycol) ethers of the general formula $RO(CH_2CH_2O)_n(CH_2O)_m(CH_2CH_2O)_n R$ is described, wherein R is an alkyl radical, n is $\leq 3$ and m is $\leq 6$, as additives to diesel fuels to reduce the particulate emission in self-ignition engines.

8 Claims, No Drawings

USE OF POLYOXYMETHYLENE DI (ALKYL POLYGLYCOL) ETHERS AS ADDITIVES TO DIESEL FUELS TO REDUCE THE PARTICULATE EMISSION IN SELF-IGNITION ENGINES

CROSS-REFERENCE TO PRIOR APPLICATION

The present application is a continuation application of International Application No. PCT/EP2010/056089, filed May 5, 2010, which claims the benefit of German Patent Application No. 10 2009 035 503.0, filed Jul. 31, 2009, both of which are incorporated herein by reference.

The invention relates to the use of polyoxymethylene di(alkyl polyglycol) ethers as additives to diesel fuels.

It is known to reduce the particulate emission in self-ignition engines by means of additives to diesel fuels.

Additives of this type are, for example, polyoxaalkanes of the general formula $R^1$—O—$CH_2$—$CHR^2$)$_n$—O—$R^3$, wherein $R^1$ is a straight-chain or branched alkyl radical, $R^2$ and $R^3$ are, identically or differently, straight-chain or branched alkyl radicals or H and n is $\geqq 1$. Polyoxaalkanes of this type are free of carbon atoms with oxidation numbers >+1. Only those polyoxaalkanes which are substantially free of toxic components are used. Exemplary representatives of this class are polyethylene glycol dialkylethers. Additions of these polyethylene glycol dialkyl ethers reduce the particulate formation in diesel engine combustion. Thus, the addition of 5% by volume tetraethylene glycol dimethyl ether to a diesel fuel according to EN 590 reduces the particulate emission of a single cylinder diesel engine by up to 70% and with a constant $NO_x$ emission by 27.4 to 54.1% depending on the operating point. The reduction in the fuel value of the fuel through the addition of tetraethylene glycol dimethyl ether is slight and is 1.6%. The oxygen content of the mixture is about 1.8%.

The reduction in the particulate emission is attributed to the formation of oxygen-containing species during the pyrolysis of these materials in the engine. These inhibit the growth of the diesel particulates. Polyethylene glycol dialkyl ethers have good solvent properties. However, materials, such as, for example, elastomers and plastics materials, and coatings, which come into contact with polyethylene glycol dialkyl ethers, therefore have to be particularly carefully selected. There is generally no reverse compatibility in old engines.

Polyethylene glycol dialkyl ether is generally produced by the following multi-stage method:
a) Alkyl glycols are produced from alkanols and ethylene oxide. Biogenically produced alkanols, such as methanol, ethanol and 1-butanol, can advantageously be used here. The production of ethylene oxide takes place by means of the catalytic oxidation of ethylene. Ethylene is produced in Europe and the USA by cracking crude oil fractions and could also be obtained, when crude oil prices are high, by the dehydration of bioethanol, as is already the case in India.
b) The alkyl glycols are converted with sodium hydroxide to form sodium alkyl glycolates.
c) The polyethylene glycol dialkyl ethers are obtained by converting the sodium alkylglycolates with alkyl chlorides.

(Arpe "Industrielle Organische Chemie", page 176/1777, Wiley-VCH 2007).

Step c) is especially critical for environmental protection reasons because of the use of alkyl chlorides. In addition, the production costs are comparatively high.

Polyoxymethylene dialkyl ethers are known from WO 2007/000428. They are less effective with regard to the reduction of particulate emission. Thus, the addition of 10% by volume oxymethylene dimethyl ether (methylal), the starting member of this class of polyoxaalkanes, to a diesel fuel according to EN 590, despite the considerably higher oxygen content of the mixture of 4.1%, only brings about a particulate reduction of 22.7 to 41.2%, depending on the engine operating point, in comparison to the particulate emission of a diesel fuel to EN 590, without additives. The reduction in the fuel value is about 4%.

The production of polyoxyalkylene dialkyl ethers, for example polyoxymethylene dimethyl ether is known from WO 2008/074704. Methanol is firstly obtained from synthesis gas, which can also be obtained from biomethane or biomass waste by pyrolysis. Methanol is then converted to formaldehyde and the conversion of the formaldehyde with methanol finally takes place via the intermediate stages methylal and trioxane by acid catalysis and polyoxymethylene dimethyl ether is obtained. Polyoxymethylene diethyl ether and polyoxymethylene dibutyl ether are obtained analogously using ethanol or 1-butanol instead of the methanol. This method is comparatively economical and can therefore compete with the production of biomass-to-liquids, BtL, from pyrolysis gas. The costs for providing systems for producing polyoxymethylene dimethyl ethers are significantly lower than those of the Fischer-Tropsch and hydrocracking systems, which are required to produce BtL.

The production of polyoxymethylene dialkyl ethers, especially polyoxymethylene dimethyl ether, polyoxymethylene diethyl ether and polyoxymethylene dibutyl ether is therefore basically possible from renewable raw materials. The use of biomass synthesis gas as the starting material therefore allows the provision of biofuels of the second and third generation.

Polyoxymethylene dimethyl ethers have good compatibility with frequently used materials, such as elastomers and plastics materials.

Polyethers of the general formula $R^1$—O—(A—O—)$_n$—$R^2$ are known from EP-A-0 014 992, in which A stands for an ethylene or 1,2-propylene group, $R^1$ stands for a $C_1$-$C_8$-alkyl radical and $R^2$ stands for hydrogen or a $C_1$-$C_4$-alkyl radical and n has a value from 1 to 5. Polyethers of this type are added to diesel fuels in quantities of 15 to 90% by volume in order to replace conventional diesel fuels completely or partially by fuels based on methanol and, above all, ethanol.

Oxygen-containing methane derivatives of the general formula $R_1$—O—$CH_2$—O—$R_2$ with $R_1$ and $R_2$ as alkyl groups are known from WO 86/03511. These are possible fuel additives.

The invention is based on the aim of providing additives to diesel fuels to reduce the particulate emission in self-ignition engines, which substantially rule out the drawbacks of known additives. In this case, the particulate emission in self-ignition engines is to be reduced and as high a fuel value as possible is to be achieved In addition, the additives should be easily and economically obtainable, as far as possible, from biogenic raw materials. The additives should be non-toxic, preferably also not harmful to health and therefore not subject to labelling requirements. Furthermore, the additives should have good material compatibility.

This aim is addressed according to the invention by the use of polyoxymethylene di(alkyl polyglycol) ethers of the general formula $$RO(CH_2CH_2O)_n(CH_2O)_m(CH_2CH_2O)_nR,$$

wherein R is an alkyl radical, n is ≦3 and m is ≦6, as an additive to diesel fuels to reduce the particulate emission in self-ignition engines.

The production of polyoxymethylene di(alkyl polyglycol) ether is known per se. This takes place from formaldehyde, paraformaldehyde or trioxane and alkyl glycols, $RCH_2CH_2OH$, or alkyl polygylcols, $R(CH_2CH_2O)_nH$, by condensation reactions catalysed by acid as follows:

(1)

and

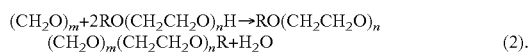

(2).

This production is described in U.S. Pat. No. 4,093,666 for $R=CH_3$ and n=1, and for $R=n-C_4H_9$ and n=1, this is known from U.S. Pat. No. 2,397,514.

The synthesis of these materials leads to the incorporation of the polyethylene glycol group, ($—CH_2—CH_2—O—$), which is especially active for the particulate reduction, with the aid of the above-mentioned condensation reactions (1) and (2) catalysed by acid and therefore avoids the expensive synthesis step of etherification of the alkyl glycols via their sodium salts by conversion with alkyl chlorides, so the environmentally damaging use of alkyl chlorides can be avoided. Simultaneously, oxymethylene groups, $—CH_2—O—$, are incorporated, which reduce the raw material costs and aggressiveness with respect to materials all the more, the higher m is. With a greater m, the fraction of biogenic carbon also increases, if biomethane is selected as the starting product for the synthesis thereof.

Furthermore, the toxicity of polyethylene glycol dimethyl ethers of the formula $CH_3O(CH_2CH_2O)_nCH_3$, where n=1 to 3, which rules out its use as a fuel additive, is eliminated by the incorporation of the oxymethylene group, $CH_2O$. Thus, for example, the oxymethylene di(methyl glycol) ether according to the invention, also: bis(2-methoxy-ethoxy)methane of the formula $CH_3OCH_2$  $CH_2OCH_2$ $OCH_2CH_2OCH_3$, is not subject to labelling requirements, while the similarly constructed diethylene glycol dimethyl ether, $CH_3OCH_2CH_2OCH_2CH_2OCH_3$, the particulate reducing properties of which are well known (SAE paper 2000-01-2886), cannot be used as a fuel additive because of its high toxicity.

The polyoxymethylene di(alkyl polyglycol) ethers used according to the invention, when used as additives to diesel fuels, lead to a significant reduction in the particulate emission. Furthermore, a high fuel value is achieved. As shown above, the polyoxymethylene di(alkyl polyglycol) ethers used according to the invention can be easily and economically also obtained from biogenic raw materials. Furthermore, they exhibit particularly good material compatibility. Thus, for example, a swelling of elastomers does not occur. There is also good mixability with the diesel fuels, as no mixing gaps occur. Finally, it is advantageous that in the use according to the invention, the use of toxic nitrate-containing compounds, for example EHN, 2-ethyl hexyl nitrate, as an ignition accelerator, can be dispensed with, as polyoxymethylene di(alkyl polyglycol) ethers also have an ignition accelerating effect and the $NO_x$ emission is also thereby lowered.

The term "polyoxymethylene di(alkyl polyglycol) ether" exclusively includes mixtures of this type of ethers.

In a preferred embodiment n=1 and m is ≦6. This has the advantage that the compounds can he produced especially economically and have very good material compatibility.

In a further preferred embodiment n=1 or 2 and m is ≦3. Compounds of this type have the advantage that they can be economically produced and have good material compatibility.

Compounds are especially preferred in which n=1 or 2 and m=1. These have the further advantage that, with a very good particulate reducing effect, they have a comparatively high volatility, which increases the fraction of a premixed and therefore low-emission, homogeneous combustion in the engine.

In a preferred embodiment, n=1 and m is ≦6. In a further preferred embodiment n=1 and m is ≦3. In a further preferred embodiment n=1 and m=1.

Polyoxymethylene di(alkyl glycol) ethers listed below of the general formula $RO(CH_2CH_2O)_n(CH_2O)_m(CH_2CH_2O)_nR$, where R is an alkyl radical, n=1 and m is ≦6, are especially preferably suitable:

Oxymethylene di(methyl glycol) ether ($C_7H_{16}O_4$; chain length 11; molecular weight 164,2; oxygen content 39%), Dioxymethylene di(methyl glycol) ether ($C_8H_{18}O_5$; chain length 13; molecular weight 194.2; oxygen content 41.2%), Trioxymethylene di(methyl glycol) ether ($C_9H_{20}O_6$; chain length 15; molecular weight 224.2; oxygen content 42.8%), Tetraoxymethylene di(methyl glycol) ether ($C_{10}H_{22}O_7$; chain length 17; molecular weight 254.3; oxygen content (44%), Pentaoxymethylene di(methyl glycol) ether ($C_{11}H_{24}O_8$; chain length 19; molecular weight 284.3; oxygen content (45%), Hexaoxymethylene di(methyl glycol) ether ($C_{12}H_{26}O_9$; chain length 21; molecular weight 314.3; oxygen content 45.8%), Oxymethylene di(ethyl glycol) ether ($C_9H_{20}O_4$; chain length 13; molecular weight 192.3; oxygen content 33.3%), Dioxymethylene di(ethyl glycol) ether ($C_{10}H_{22}O_5$; chain length 15; molecular weight 222,3; oxygen content 36%), Trioxymethylene di(ethyl glycol) ether ($C_{11}H_{24}O_6$; chain length 17; molecular weight 252.3; oxygen content 38%).

Tetraoxymethylene di(ethyl glycol) ether ($C_{12}H_{26}O_7$; chain length 19; molecular weight 282.3; oxygen content 39.7%), Oxymethylene di(butyl glycol) ether ($C_{13}H_{28}O_4$; chain length 17; molecular weight 248.4; oxygen content 25.8%), Dioxymethylene di(butyl glycol) ether ($C_{14}H_{30}O_5$; chain length 19; molecular weight 278.4; oxygen content 28.7%), Trioxymethylene di(butyl glycol) ether ($C_{15}H_{32}O_6$; chain length 21; molecular weight 308.4; oxygen content 31.1%), Oxymethylene di(methyl diglycol) ether, $C_{11}H_{24}O_6$, i.e. a compound, in which n=2 and m=1, is also especially suitable. The chain length is 17 and the molecular weight is 252.3; oxygen content 38%.

Also suitable are analogous compounds and their mixtures, which can be produced from diethylene and triethylene glycol monoalkyl ethers.

In a preferred embodiment, R is a straight-chain alkyl radical, This has the advantage that the particulate reduction is generally higher than in branched alkyl radicals.

In a further preferred embodiment, R is a methyl, ethyl, or n-butyl radical. Compounds of this type are especially suitable for use as biofuel additives of the second and third generation because of the biogenic availability of methanol, ethanol and n-butanol.

R is especially preferably an ethyl or n-butyl radical, especially an n-butyl radical, as the mixability with the diesel fuel increases in this order. This has the further advantage that solvents, such as FAME, can substantially be dispensed with.

The sum of the chain members (C- and O-atoms) is preferably <35, especially <30, and especially preferably about 11 to about 21. This has the advantage that the 95% boiling limit of 360° C. valid for the fuel standard EN 590 is not exceeded owing to the additives.

In a preferred embodiment, the polyoxymethylene di(alkyl polyglycol) ether is used in a quantity of less than about 15% by volume, preferably in a quantity of less than 10% by volume, and especially preferably in a quantity of less than 5% by volume, based on the diesel fuel. The lower the quantity of polyoxymethylene di(alkyl polyglycol) ether, the lower the additional costs.

In a further preferred embodiment, up to 5% by volume FAME (EN 590), up to 7% by volume FAME (DIN 51628) or up to 10% by volume FAME can be added to the diesel fuel. The use of FAME has the advantage that it is used as a solubiliser, in order to be able to improve the mixability of the higher-molecular polyoxymethylene di(alkyl polyglycol) ether with diesel fuel. The use of pure biodiesel (EN 14214) with 100% FAME and of synthetic diesel (gas-to-liquid, biomass-to-L., coal-to-L.) is preferred.

The use according to the invention is also popular in engines of an older type of construction. In other words, there is also reverse compatibility. This is a further advantage of the use of the additives according to the invention in comparison with the use of polyethylene glycol dialkyl ethers.

The invention will be further illustrated below with the aid of examples. The examples are not, however, to be in any way limiting or restricting with respect to the present invention.

EXAMPLE 1

A fuel mixture of 95% by volume diesel fuel to EN 590 and 5% by volume oxymethylene di(methyl glycol) ether, (other designation: bis(2-methoxyethoxy) methane; $C_7H_{16}O_4$, boiling point 197/205° C., company Alfa Aesar, D-76057 Karlsruhe) was tested on a MAN single cylinder research engine with a displacement of 1.75 l, an engine performance of 55 kW, a common rail injection system (rail pressure 1,800 bar), a compression of 20.5, an injection start before the top dead centre of −8° crank angle and an EGR rate of 20%. Diesel fuel without additions of additives to EN 590 was used as a comparative fuel.

The particulate reduction was determined using a micro soot sensor from the company AVL.

The results can be inferred from the following Table 1.

TABLE 1

| Operating point | BP 1 | BP 2 | BP 3 | BP 4 |
|---|---|---|---|---|
| Particulate reduction ($NO_x$-emission level constant) % | −42.7 | −51.1 | −51.6 | −28.2 |
| Speed rpm | 914 | 1,542 | 1,542 | 1,800 |
| Torque Nm | 75 | 200 | 270 | 140 |
| Mean pressure bar | 6.3 | 15.7 | 20.7 | 11.7 |
| Air number | 3.1 | 1.35 | 1.35 | 1.9 |

This test shows that the addition of small quantities of oxymethylene di(methyl glycol) ether to diesel fuel leads to a significant particulate reduction, which is all the higher, the lower the air excess during the combustion (see air number in Table 1).

EXAMPLE 2

A fuel mixture of 95% by volume diesel fuel to EN 590 and 5% by volume oxymethylene di(methyl diglycol) ether, (boiling point 315/325° C., company DWS Synthesetechnik, D-86356 NeusaB) was tested on the test motor described in Example 1.

At the operating points described in Example 1, the following particulate reduction in the fuel mixture in comparison to a diesel fuel to EN 590 was found using the micro soot sensor, the NO emission level having been kept constant. The results can be inferred from the following Table 2.

TABLE 2

| Operating point | BP 1 | BP 2 | BP 3 | BP 4 |
|---|---|---|---|---|
| Particulate reduction ($NO_x$-emission level constant) % | −43.6 | −54.1 | −54.0 | −28.5 |

This test also shows that an addition of oxymethylene di(methyl diglycol) ether leads to a significant particulate reduction which is all the higher, the lower the air excess during the combustion (see air number in Table 1). Oxymethylene di(methyl diglycol) ether contains, per molecule, four ethylene glycol groups per oxymethylene group and therefore contains a slightly higher particulate reduction activity than the oxymethylene di(methyl glycol) ether listed in Example 1, which, per molecule, only contains two ethylene glycol groups per oxymethylene group.

COMPARATIVE EXAMPLE 1

A fuel mixture of 95% by volume diesel fuel to EN 590 and 5% by volume tetraethylene glycol dimethyl ether was tested under the test conditions described in Example 1.

The results can be inferred from the following Table 3. Diesel fuel to EN 590, to which additives were not added, was used as a comparison.

TABLE 3

| Operating point | BP 1 | BP 2 | BP 3 | BP 4 |
|---|---|---|---|---|
| Particulate reduction ($NO_x$-emission level constant) % | −41.2 | −54.1 | −52.9 | −27.4 |

COMPARATIVE EXAMPLE 2

A fuel mixture of 95% by volume diesel fuel to EN 590 and 10% by volume methylal (oxymethylene dimethyl ether) was tested under the test conditions described in Example 1.

The results can be inferred from the following Table 4. Diesel fuel to EN 590, to which additives were not added, was used as the comparative fuel.

TABLE 4

| Operating point | BP 1 | BP 2 | BP 3 | BP 4 |
|---|---|---|---|---|
| Particulate reduction ($NO_x$-emission level constant) % | −49.2 | −37.4 | −41.2 | −22.7 |

The invention claimed is:

1. A method for reducing particulate emission in a self-ignition engine comprising the steps of:
preparing a diesel fuel mixture including an additive comprising polyoxymethylene di(alkyl polyglycol) ethers of the general formula:

$RO(CH_2CH_2O)_n(CH_2O)_m(CH_2CH_2O)_nR,$ wherein R is an alkyl radical, n is 1 or 2 and m is 1, and combusting the diesel fuel mixture in the self-ignition engine, thereby reducing the particulate emission thereof.

2. A method for reducing particulate emission in self-ignition engine comprising the steps of:
preparing a diesel fuel mixture including an additive comprising polyoxymethylene di(alkyl polyglycol) ethers of the general formula:

$RO(CH_2CH_2O)_n(CH_2O)_m(CH_2CH_2O)_nR,$ wherein R is an alkyl radical, n is 1 and m is 1; and combusting the diesel fuel mixture in the self-ignition engine, thereby reducing the particulate emission thereof.

3. The method according to claim 1, wherein R is a straight-chain alkyl radical.

4. The method according to claim 1, wherein R is a methyl, ethyl, or n-butyl radical.

5. The method according to claim 1, wherein the 95% boiling limit of the diesel fuel, to which the polyoxymethylene di(alkyl polyglycol) ether is added, is below 360°.

6. The method according to claim 1, wherein the sum of the chain members (C- and O- atoms) of the polyoxymethylene di(alkyl polyglycol) ether is $\leq 35$.

7. The method according to claim 1, wherein the polyoxymethylene di(alkyl polyglycol) ether is present in a quantity of less than about 15% by volume.

8. The method according to claim 1, wherein the diesel fuel contains up to 5% by volume of a fatty acid methyl ester (FAME).

* * * * *